(12) United States Patent
Cho (10) Patent No.: US 6,449,701 B1
(45) Date of Patent: Sep. 10, 2002

(54) OUT OF ORDER ASSOCIATIVE QUEUE IN TWO CLOCK DOMAINS

(75) Inventor: James Y. Cho, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 138 days.

(21) Appl. No.: 09/665,982

(22) Filed: Sep. 20, 2000

(51) Int. Cl.[7] ............................................... G06F 12/00

(52) U.S. Cl. .................. 711/154; 711/117; 710/39; 710/52

(58) Field of Search ................................ 711/154, 117; 710/39, 40, 52

(56) References Cited

U.S. PATENT DOCUMENTS

| 5,448,715 | A | | 9/1995 | Lelm et al. ................. 710/310 |
|---|---|---|---|---|
| 5,721,839 | A | | 2/1998 | Callison et al. ............. 713/600 |
| 6,101,568 | A | * | 8/2000 | Richardson ................. 710/310 |
| 6,205,506 | B1 | * | 3/2001 | Richardson ................. 710/310 |
| 6,321,303 | B1 | * | 11/2001 | Hoy et al. ................... 711/123 |

OTHER PUBLICATIONS

Halfhill, "SiByte Reveals 64-bit Core for NPUs," Microprocessor Report, Jun. 2000, pp. 45–48.

* cited by examiner

Primary Examiner—Hiep T. Nguyen
(74) Attorney, Agent, or Firm—Conley, Rose & Tayon, PC; Lawrence J. Merkel (57) ABSTRACT

A memory controller may include a request queue for receiving transaction information (e.g. the address of the transaction) and a channel control circuit. A control circuit for the request queue may issue addresses from the request queue to the channel control circuit out of order, and thus the memory operations may be completed out of order. The request queue may shift entries corresponding to transactions younger than a completing transaction to delete the completing transaction's information from the request queue. However, a data buffer for storing the data corresponding to transactions may not be shifted. Each queue entry in the request queue may store a data buffer pointer indicative of the data buffer entry assigned to the corresponding transaction. The data buffer pointer may be used to communicate between the channel control circuit, the request queue, and the control circuit. In one implementation, the request queue may implement associative comparisons of information in each queue entry (e.g. transaction IDs and/or data buffer pointers). In one embodiment, the request queue and control circuit may be in the bus clock domain, while the channel control circuit may be in the memory clock domain.

31 Claims, 7 Drawing Sheets

OUT OF ORDER ASSOCIATIVE QUEUE IN TWO CLOCK DOMAINS

BACKGROUND OF THE INVENTION

1. Field of the Invention

This invention is related to the field of memory controllers and, more particularly, to queues in memory controllers.

2. Description of the Related Art

Generally, memory controllers are used to interface various devices with a memory. Typically, the devices initiate transactions to read or write the memory on a bus, and the memory controller receives the transactions from the bus and performs the appropriate read or write operations to the memory.

In the past, buses have typically required that data for various transactions be returned in the same order that the corresponding addresses were presented on the bus. Accordingly, queues of transactions in memory controllers were typically first-in, first-out (FIFO) buffers. However, more recently, buses have become tagged, out of order buses in which data may be returned for transactions in any order as compared to the order that the corresponding addresses were presented. A tag, or transaction identifier, is presented on the bus concurrent with each address, and the tag is also presented when the data is transferred. Thus, the address and data portions of each transaction may be linked via the tag. Accordingly, improvements in memory queue design are needed to take advantage of the out of order nature of the buses.

Additionally, as synchronous dynamic random access memory (SDRAM) has become more popular, an additional difficulty has been faced by memory controller designs. The clock for the SDRAM memory may generally be of a different frequency than the bus clock, and may not be phase aligned to the bus clock. Thus, the memory controller may bridge two different clock domains: the bus clock domain and the memory clock domain. A memory controller with improved memory queue design which also handles the transitions between clock domains is therefore needed.

SUMMARY OF THE INVENTION

The problems outlined above are in large part solved by a memory controller as described herein. The memory controller may include a request queue for receiving transaction information (e.g. the address of the transaction) and a channel control circuit which controls a memory bus. A control circuit for the request queue may issue addresses from the request queue to the channel control circuit out of order, and thus the memory operations may be completed out of order. In one embodiment, the request queue shifts entries corresponding to transactions younger than a completing transaction to delete the completing transaction's information from the request queue. However, a data buffer for storing the data corresponding to transactions may not be shifted. Each queue entry in the request queue may store a data buffer pointer indicative of the data buffer entry assigned to the corresponding transaction. The data buffer pointer remains constant throughout the life of the transaction in the memory controller, and may be used to communicate between the channel control circuit, the request queue, and the control circuit.

In one implementation, the request queue may implement associative comparisons of information in each queue entry. For example, the transaction ID on the data bus may be associatively compared to transaction IDs in the entry to detect the data phases of transactions, which may be out of order with the corresponding address phases. Also, the data buffer pointers may be associatively compared to the data buffer pointer returned by the channel control circuit for communication regarding a particular transaction.

In one embodiment, the request queue and control circuit may be in the bus clock domain, while the channel control circuit may be in the memory clock domain. Thus, the interface between the channel control circuit and the request queue and control circuit may include acknowledgement of communications from the other clock domain to handle to the clock domain crossings.

Broadly speaking, a memory controller is contemplated. The memory controller may include a queue, a channel control circuit, and a control circuit. The queue is coupled to receive at least addresses of transactions from a bus, and the queue has a plurality of queue entries. Each of the plurality of queue entries is configured to store an address of a transaction and a pointer to a data buffer entry corresponding to the transaction. Coupled to the queue, the channel control circuit is configured to interface to a memory. Coupled to the queue and to the channel control circuit, the control circuit is configured to issue a first address of a first transaction and a first pointer to the data buffer entry corresponding to the first transaction. The channel control circuit is configured to acknowledge the first address by returning the first pointer to the queue.

Additionally, a method is contemplated. At least addresses of transactions are received from a bus into a queue having a plurality of queue entries. Each of the plurality of queue entries is configured to store an address of a transaction and a pointer to a data buffer entry corresponding to the transaction. A first address of a first transaction and a first pointer to a data buffer entry corresponding to the first address are issued to a channel control circuit. The first pointer is returned from the channel control circuit to acknowledge the issuing of the first address.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the

DETAILED DESCRIPTION OF THE PREFERRED EMBODIMENTS

System Overview

Figure 1:
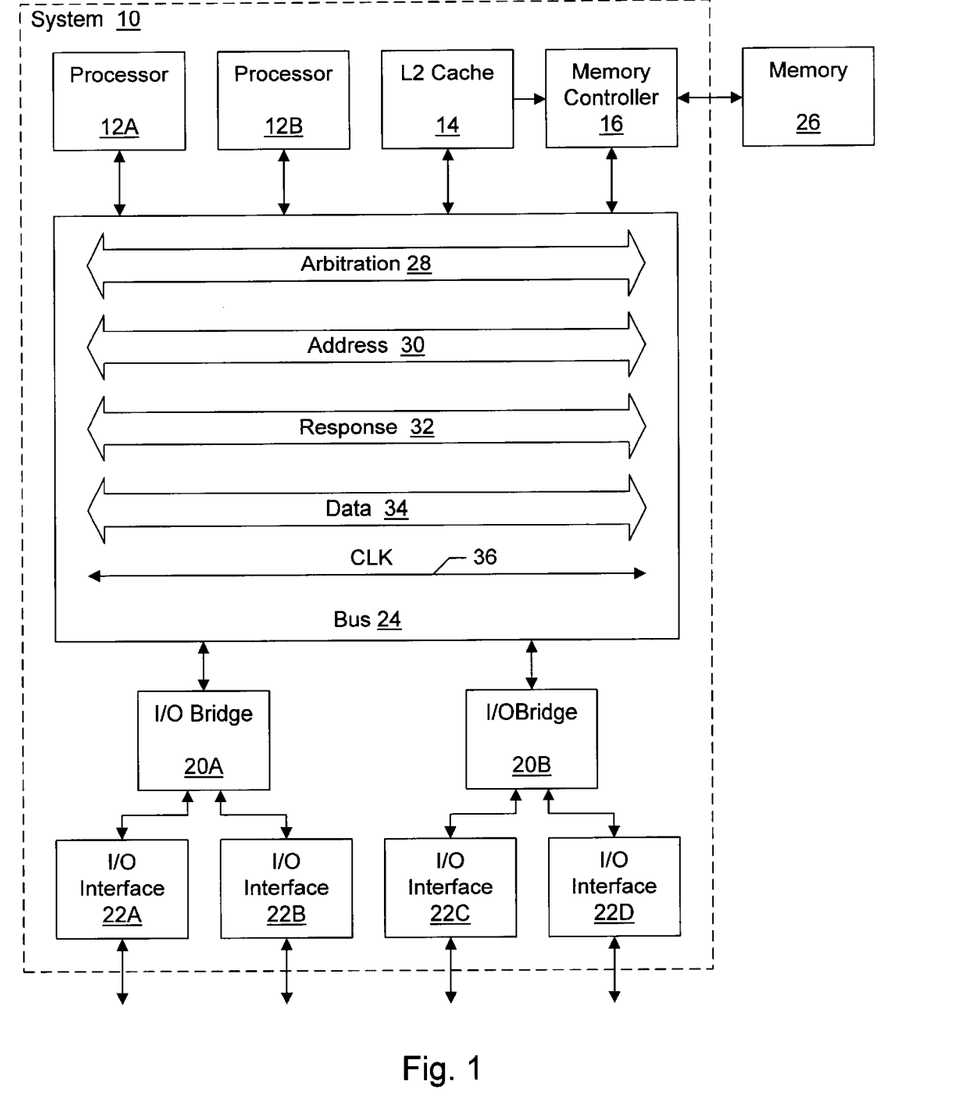
FIG. 1 is a block diagram of one embodiment of a system.

Turning now to FIG. 1, a block diagram of one embodiment of a system 10 is shown. Other embodiments are possible and contemplated. In the embodiment of FIG. 1, system 10 includes processors 12A–12B, an L2 cache 14, a memory controller 16, a pair of input/output (I/O) bridges 20A–20B, and I/O interfaces 22A–22D. System 10 may include a bus 24 for interconnecting the various components of system 10. More particularly, as illustrated in FIG. 1, bus 24 may include arbitration lines 28, an address bus 30, response lines 32, a data bus 34, and a clock line or lines 36. As illustrated in FIG. 1, each of processors 12A–12B, L2 cache 14, memory controller 16, and I/O bridges 20A–20B are coupled to bus 24. Thus, each of processors 12A–12B, L2 cache 14, memory controller 16, and I/O bridges 20A–20B may be an agent on bus 24 for the illustrated embodiment. More particularly, each agent may be coupled to clock line(s) 36 and to the conductors within bus 24 that carry signals which that agent may sample and/or drive. I/O bridge 20A is coupled to I/O interfaces 22A–22B, and I/O bridge 20B is coupled to I/O interfaces 22C–22D. L2 cache 14 is coupled to memory controller 16, which is further coupled to a memory 26.

Generally speaking, agents may participate in transactions on bus 24. As used herein, the term "agent" refers to a device which is capable of communicating on the bus. The agent may be a requesting agent if the agent is capable of initiating transactions on the bus and may be a responding agent if the agent is capable of responding to a transaction initiated by a requesting agent. A given agent may be capable of being both a requesting agent and a responding agent. Additionally, a "transaction" is a communication on the bus. The transaction may include an address transfer and optionally a data transfer. Transactions may be read transactions (transfers of data from the responding agent to the requesting agent) and write transactions (transfers of data from the requesting agent to the responding agent). Transactions may further include various coherency commands which may or may not involve a transfer of data.

Transactions on bus 24 may target memory locations in memory 26 ("memory transactions"). Memory controller 16 is the responding agent for memory transactions, unless the memory transactions hit in L2 cache 14, in which case L2 cache 14 may be the responding agent. Other embodiments may not include L2 cache 14 and memory controller 16 may be the responding agent for all memory transactions.

Bus 24 may be a split transaction bus in the illustrated embodiment. A split transaction bus splits the address and data portions of each transaction and allows the address portion (referred to as the address phase) and the data portion (referred to as the data phase) to proceed independently. In the illustrated embodiment, the address bus 30 and data bus 34 are independently arbitrated for (using signals on arbitration lines 28). Each transaction including both address and data thus includes an arbitration for the address bus 30, an address phase on the address bus 30, an arbitration for the data bus 34, and a data phase on the data bus 34. Additionally, coherent transactions may include a response phase on response lines 32 for communicating coherency information after the address phase. The bus clock signal CLK on clock line(s) 36 defines the clock cycle for bus 24.

Bus 24 may allow for out of order data phases with respect to the corresponding address phases. Thus, address bus 30 may include a transaction identifier (transaction ID) used as a tag for the address phase and corresponding data phase. Data bus 34 may include a transaction ID as well. The agent providing the data may transmit the transaction ID captured from the corresponding address phase as the transaction ID on data bus 34 to link the data phase to the corresponding address phase. Generally, a transaction ID is a value used to correlate an address and a data phase. In one embodiment, for example, the transaction ID may include an agent ID portion and a sequence number portion. The agent ID portion may be used to transmit an agent ID identifying which requesting agent on bus 24. The sequence number may be used by the requesting agent to uniquely identify the transaction with respect to other outstanding transactions. The same sequence number may not be reused by that requesting agent until the transaction ID is no longer needed (e.g. until the data phase of the transaction).

Bus 24 may be pipelined. Bus 24 may employ any suitable signaling technique. For example, in one embodiment, differential signaling may be used for high speed signal transmission. Other embodiments may employ any other signaling technique (e.g. TTL, CMOS, GTL, HSTL, etc.).

Processors 12A–12B may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture.

L2 cache 14 is a high speed cache memory. L2 cache 14 is referred to as "L2" since processors 12A–12B may employ internal level 1 ("L2") caches. If L1 caches are not included in processors 12A–12B, L2 cache 14 may be an L1 cache. Furthermore, if multiple levels of caching are included in processors 12A–12B, L2 cache 14 may be a outer level cache than L2. L2 cache 14 may employ any organization, including direct mapped, set associative, and fully associative organizations. In one particular implementation, L2 cache 14 may be a 512 kilobyte, 4 way set associative cache having 32 byte cache lines. A set associative cache is a cache arranged into multiple sets, each set comprising two or more entries. A portion of the address (the "index") is used to select one of the sets (i.e. each encoding of the index selects a different set). The entries in the selected set are eligible to store the cache line accessed by the address. Each of the entries within the set is referred to as a "way" of the set. The portion of the address remaining after removing the index (and the offset within the cache line) is referred to as the "tag", and is stored in each entry to identify the cache line in that e try. The stored tags are compared to the corresponding tag portion of the address of a memory transaction to determine if the memory transaction hits or misses in the cache, and is used to select the way in which the hit is detected (if a hit is detected).

Memory controller 16 is configured to access memory 26 in response to memory transactions received on bus 24. Memory controller 16 receives a hit signal from L2 cache 14, and if a hit is detected in L2 cache 14 for a memory transaction, memory controller 16 does not respond to that memory transaction. If a miss is detected by L2 cache 14, or the memory transaction is non-cacheable, memory controller 16 may access memory 26 to perform the read or write operation. Memory controller 16 may be designed to access any of a variety of types of memory. For example, memory controller 16 may be designed for synchronous dynamic random access memory (SDRAM), and more particularly double data rate (DDR) SDRAM. Alternatively, memory controller 16 may be designed for DRAM, Rambus DRAM (RDRAM), SRAM, or any other suitable memory device.

I/O bridges 20A–20B link one or more I/O interfaces (e.g. I/O interfaces 22A–22B for I/O bridge 20A and I/O interfaces 22C–22D for I/O bridge 20B) to bus 24. I/O bridges 20A–20B may serve to reduce the electrical loading on bus 24 if more than one I/O interface 22A–22B is bridged by that I/O bridge. Generally, I/O bridge 20A performs transactions on bus 24 on behalf of I/O interfaces 22A–22B and relays transactions targeted at an I/O interface 22A–22B from bus 24 to that I/O interface 22A–22B. Similarly, I/O bridge 20B generally performs transactions on bus 24 on behalf of I/O interfaces 22C–22D and relays transactions targeted at an I/O interface 22C–22D from bus 24 to that I/O interface 22C–22D. In one implementation, I/O bridge 20A may be a bridge to a PCI interface (e.g. I/O interface 22A) and to a Lightning Data Transport (LDT) I/O fabric developed by Advanced Micro Devices, Inc (e.g. I/O interface 22B). Other I/O interfaces may be bridged by I/O bridge 20B. Other implementations may bridge any combination of 110 interfaces using any combination of I/O bridges. I/O interfaces 22A–22D may include one or more serial interfaces, Personal Computer Memory Card International Association (PCMCIA) interfaces, Ethernet interfaces (e.g. media access control level interfaces), Peripheral Component Interconnect (PCI) interfaces, LDT interfaces, etc.

It is noted that system 10 (and more particularly processors 12A–12B, L2 cache 14, memory controller 16, I/O interfaces 22A–22D, I/O bridges 20A–20B and bus 24 may be integrated onto a single integrated circuit as a system on a chip configuration. In another configuration, memory 26 may be integrated as well. Alternatively, one or more of the components may be implemented as separate integrated circuits, or all components may be separate integrated circuits, as desired. Any level of integration may be used.

It is noted that, while the illustrated embodiment employs a split transaction bus with separate arbitration for the address and data buses, other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice.

It is noted that, while FIG. 1 illustrates I/O interfaces 22A–22D coupled through I/O bridges 20A–20B to bus 24, other embodiments may include one or more I/O interfaces directly coupled to bus 24, if desired.

Memory Controller

Figure 2:
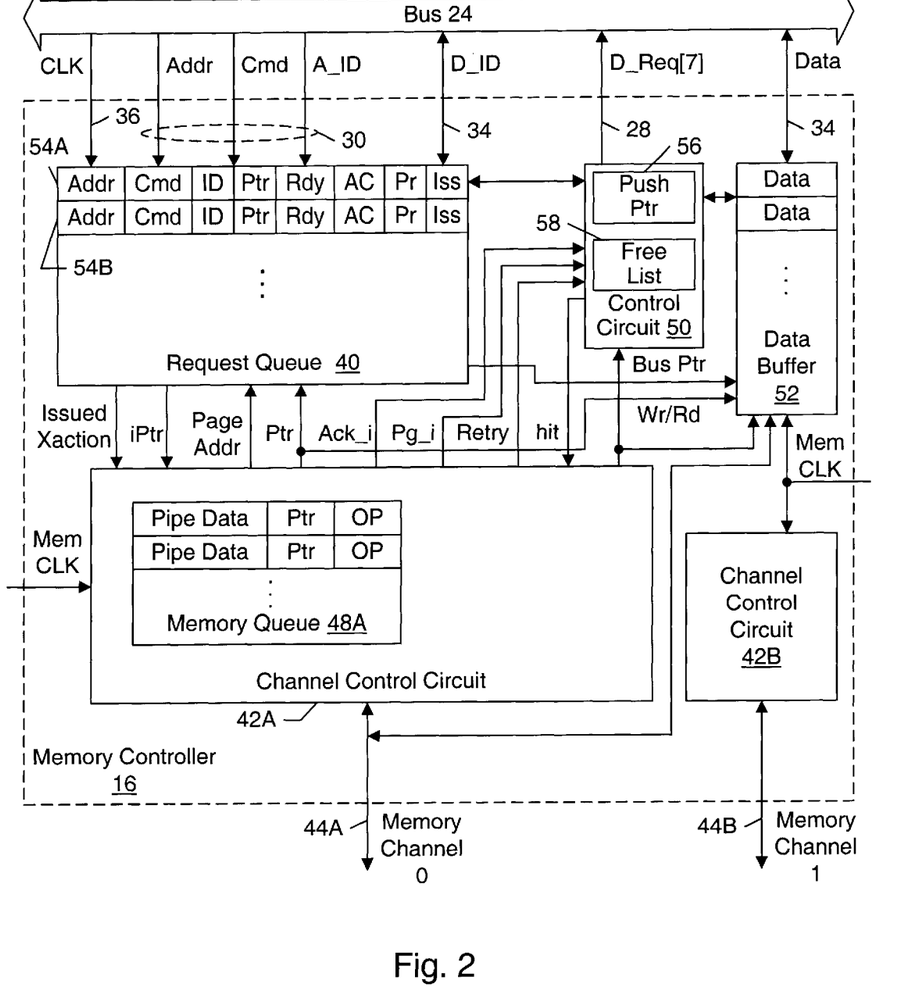
FIG. 2 is a block diagram of one embodiment of a memory controller shown in FIG. 1.
Figure 4:
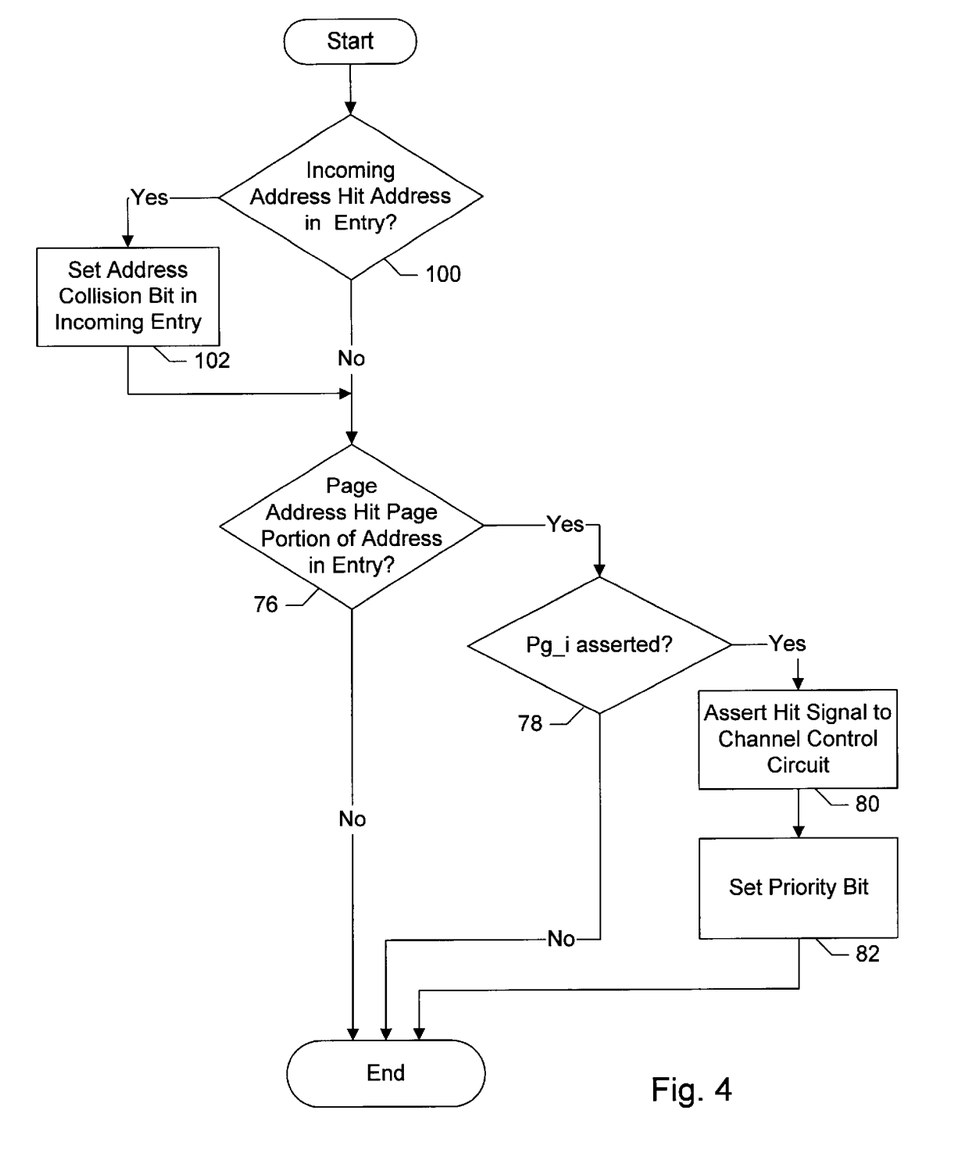
FIG. 4 is a flowchart illustrating operation of one embodiment of a control circuit in response to address comparisons.
Figure 5:
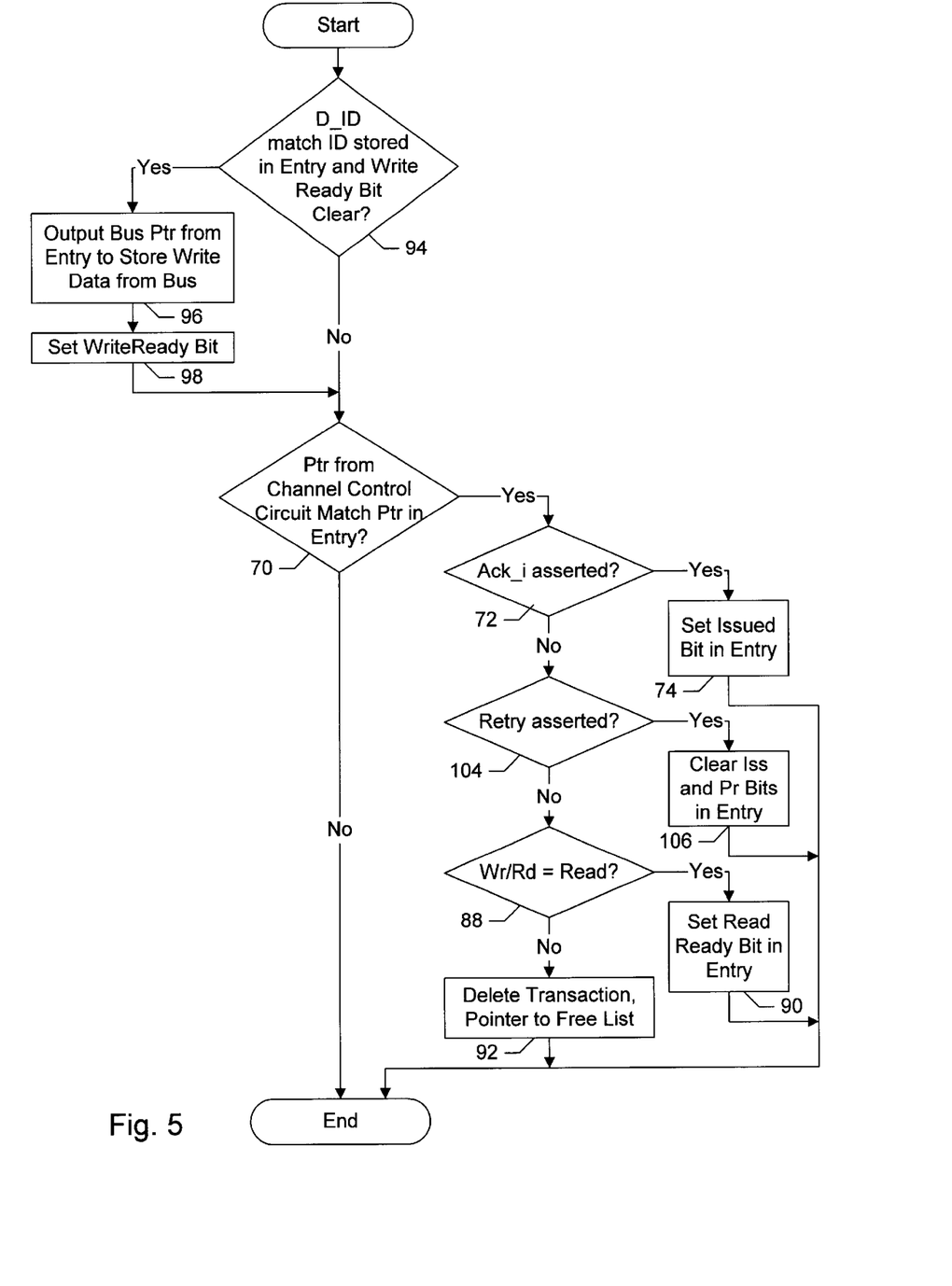
FIG. 5 is a flowchart illustrating operation of one embodiment of a control circuit in response to transaction ID and pointer comparisons.

Turning next to FIG. 2, a block diagram of one embodiment of memory controller 16 is shown. Other embodiments are possible and contemplated. In the embodiment of FIG. 2, memory controller 16 includes a request queue 40, a control circuit 50, a data buffer 52, and channel control circuits 42A–42B. Request queue 40, control circuit 50, and data buffer 52 are coupled to receive information from bus 24 and are coupled to channel control circuits 42A–42B. Each of channel control circuits 42A–42B is coupled to a respective memory channel 44A–44B. Channel control circuit 42A includes a memory queue 48A, and channel control circuit 42B may include a similar memory queue (not shown). Various interface signals between channel control circuit 42A and request queue 40, control circuit 50, and data buffer 52 are illustrated. Similar interface signals between channel control circuit 42B and request queue 40, control circuit 50, and data buffer 52 may be provided (not shown). Channel control circuits 42A–42B and data buffer 52 are coupled to receive a memory clock (Mem CLK) corresponding to memory attached to memory channels 44A–44B. FIGS. 4 and 5 are flowcharts illustrating various operations which may be performed by one embodiment of control circuit 50, and these flowcharts are referred to below in the description of FIG. 2. While blocks shown in FIGS. 4 and 5 are illustrated in a particular order for ease of understanding, any suitable order may be used. Furthermore, blocks may be performed in parallel by combinatorial logic circuitry within control circuit 50.

In the illustrated embodiment, request queue 40 is coupled to receive the bus clock on bus clock line 36, at least a portion of address bus 30 (including address lines (Addr) carrying the address, command lines (Cmd) carrying the command, and an address transaction identifier (A_ID)), and a data transaction identifier (D_ID) which is part of data bus 34. Control circuit 50 is coupled to a data request line (D_Req[7]) which is part of arbitration lines 28. Data buffer 52 is coupled to data lines for transferring data. The data lines are also part of data bus 34. Control circuit 50 is coupled to both request queue 40 and data buffer 52, and request queue 40 is coupled to provide a pointer (Bus Ptr) to data buffer 52. Additionally, control circuit 50 is coupled to channel control circuit 42A to receive an acknowledge signal (Ack_I), a retry signal (Retry), a page inquire signal (Pg_i), a write signal (Wr), a read signal (Rd), and associated data buffer pointers (Ptr). Control circuit 50 is further coupled to provide a hit signal (hit). Request queue 40 is coupled to provide issued transaction information including at least the address of the transaction (Issued Xaction) and an issue data buffer pointer (iPtr) to channel control circuit 42A, and is coupled to receive a page address (Page Addr) and data buffer pointers (Ptr) from channel control circuit 42A. Data buffer 52 is further coupled to receive the Ptr and Wr/Rd signals and to receive data from and provide data on memory channel 44A.

Request queue 40 includes multiple queue entries. Queue entries 54A–54B are illustrated in FIG. 2, although request queue 40 may include any number of queue entries. Data buffer 52 includes a number of data buffer entries equal to the number of queue entries in request queue 40. When the address phase of a memory transaction is presented on bus 24 (more particularly address bus 30), control circuit 50 allocates a queue entry and a data buffer entry for the memory transaction. The allocated queue entry receives the information from address bus 30, including at least the address of the transaction. Various embodiments may capture other information (including, for example, the command encoding indicating the read or write nature of the transaction and the transaction ID for the present embodiment). The captured information is stored in various fields of the allocated entry (e.g. the Addr field for the address, the Cmd field for the command encoding, and the ID field for the transaction ID, in the illustrated embodiment).

Queue entries in request queue 40 may be allocated to transactions in the order the transactions are received. Thus, control circuit 50 may maintain a push pointer (reference numeral 56) indicative of the next queue entry in request queue 40 to be allocated. When a memory transaction is received, information from the transaction is written to the allocated queue entry and the push pointer 56 is incremented. On the other hand, control circuit 50 may schedule transactions for memory access via channel control circuits 42A–42B out of order (e.g. in a different order than the order in which the address phases of the transactions are received). Accordingly, queue entries in request queue 40 may be deleted out of order as transactions may complete out of order. When a transaction is completed, the queue entries storing information corresponding to transactions younger than the completing transaction may be shifted one entry toward the head of request queue 40 (which stores the oldest transaction in request queue 40). In this manner, the completing transaction information may be deleted from request queue 40 by being overwritten by information corresponding to a younger transaction. The push pointer may also be decremented to reflect the freeing of an entry as the entries are collapsed together. As used herein, a first transaction is "younger" than a second transaction if the first transaction's address phase occurred later in time on address bus 30 than the second transaction's address phase. Similarly, the first transaction is "older" than the second transaction if the first transaction's address phase occurred earlier in time on address bus 30 than the second transaction's address phase.

Data buffer 52 may not shift entries as transactions are completed. Accordingly, each queue entry of request queue 40 stores a data buffer pointer indicative of the data buffer entry assigned to the transaction corresponding to that queue entry (the Ptr field illustrated in entries 54A–54B). Control circuit 50 maintains a free list 58 of data buffer entries which are not currently in use for transactions represented in request queue 40, and assigns a data buffer entry from the free list for a memory transaction received on bus 24. The data buffer pointer corresponding to the assigned data buffer entry is stored in the assigned queue entry. The assigned data buffer entry is deleted from free list 58, and is added back to free list 58 when the transaction completes and is deleted from request queue 40 and data buffer 52.

The interface between request queue 40, control circuit 50, and channel control circuit 42A will be described below, and the interface between request queue 40, control circuit 50, and channel control circuit 42B may be similar, as mentioned above. Generally, control circuit 50 issues transactions to one of channel control circuits 42A–42B for access to memory 26. In the illustrated embodiment, memory 26 is divided into two portions accessed by independent channels 44A–44B. Other embodiments may have more or fewer channels. The memory address range is mapped onto the channels (and may be mapped to multiple chip selects on a channel, etc.) via configuration registers, not shown. Thus, based on the address of the transaction, the control circuit 50 may determine which channel control circuit 42A–42B to issue a given transaction to.

Since the entries of data buffer 52 are not shifted as transactions are completed, the data buffer pointer in each queue entry may be used as an identifier for the transaction for communications between request queue 40, control circuit 50, and channel control circuits 42A. At least the address of a transaction selected for issuance to channel control circuit 42A (and any other information which may be useful to channel control circuits 42A–42B, e.g. whether the transaction is a read or a write) is transmitted, via the Issued Xaction lines shown in FIG. 2, to the channel control circuit 42A. Concurrently, the corresponding data buffer pointer is transmitted to the selected channel control circuit (iPtr in FIG. 2). Transmitting at least the address of the transaction to a channel control circuit will be referred to below as issuing the transaction. Channel control circuit 42A may acknowledge receipt of the transaction information by returning the data buffer pointer (Ptr in FIG. 2) and asserting the acknowledge signal (Ack_i). Even if the queue entry storing the transaction information has changed due to the deletion of one or more older transactions, the data buffer pointer identifies the transaction in request queue 40.

Compare circuitry in request queue 40 may compare the data buffer pointers (Ptr) returned by channel control circuit 42A to the data buffer pointers in each queue entry to identify which transaction is being acknowledged, and an issued indication (Iss in each queue entry illustrated in FIG. 2) may be set to a state indicating that the transaction has been issued. The transaction may not be considered for subsequent issuance by control circuit 50 when the issued indication is in a state indicating that the transaction has been issued. For example, the issued indication may be a bit. In one example the bit may be indicative, when set, that the transaction has been issued and indicative, when clear, that the transaction has not been issued. Alternatively, the bit may be indicative, when set, that the transaction has not been issued and indicative, when clear, that the transaction has been issued. Other encodings are possible as well. The setting of the issued indication is illustrated in FIG. 5 via decision blocks 70 and 72 and block 74.

As described in more detail below, channel control circuits 42A–42B may be in the clock domain corresponding to the memory clock (Mem CLK), so that channel control circuits 42A–42B may communicate with the memory on the corresponding memory channels. Request queue 40 and control circuit 50 may be in the clock domain corresponding to the bus clock (CLK). Accordingly, the interface between the channel control circuits 42A–42B and the request queue 40 and control circuit 50 occurs across clock domains. Two clock domains may be synchronous or asynchronous. For asynchronous clock domains, signals may be synchronized into the clock domain of the receiver using various synchronizing circuits (e.g. a serial connection of at least two flip flops per bit, clocked by the clock corresponding to the receiving clock domain). Therefore, the acknowledgement of a transaction issued to channel control circuit 42A may occur one or more clock cycles after the issuance. Again, since the data buffer entry corresponding to the transaction is fixed throughout the life of the transaction in memory controller 16, the data buffer pointer may be used to identify the transaction during the acknowledgement.

Channel control circuit 42A may assign a memory queue entry in memory queue 48A to the transaction, and may store the transaction information in that entry. For example, the pointer (Ptr) is illustrated in each memory queue entry shown in FIG. 2. The address and read/write information may also be stored (not shown). The channel control circuit 42A receiving the transaction interfaces with the memory coupled to memory channel 44A, and performs the read or write specified by the transaction. Generally, interfacing with the memory may include transmitting the row address, transmitting the column address, and transmitting or receiving the data. The timing for transmitting the row address, transmitting the column address, and transmitting or receiving the data may depend on the type of memory attached to memory channel 44A, and generally occurs over several clock cycles of the memory clock (Mem CLK). The memory queue 48A stores information (Pipe Data in FIG. 2) identifying the progress of the transaction on memory channel 44A and allows channel control circuit 42A to determine appropriate points in time to perform various actions of the memory access. In one embodiment, the Pipe Data for each transaction may be a string of bits in a scoreboard fashion, identifying points in time (referenced to the memory clock) at which various actions are to be performed. The scoreboard data may be shifted each memory clock, and actions may be performed as the Pipe Data indicates. Additionally, the Pipe Data may be used to detect timing conflicts with transactions being issued. If a conflict is detected, the incoming transaction may not be acknowledged and may be reissued by control circuit 50 at a later time.

In one embodiment, channel control circuit 42A may either keep the page addressed by the transaction open or close. Generally, DRAM allows for a page mode of operation in which a row of storage locations addressed by a particular row address may be opened by transmitting the row address, and then column addresses corresponding to data to be accessed may be presented for each read or write in the page without retransmitting the row address. For example, in asynchronous DRAMs, keeping the row address strobe (RAS) signal asserted may result in the page remaining open. For SDRAMs, read and write commands may be transmitted without the autoprecharge option to keep the page open. Thus, a page is an amount of memory addressed with one row address presented on channel 44A or 44B. The page address is the portion of the address used to address a page (i.e. the row address). Channel control circuit 42A may be programmable with various page mode policies, including a CAS time check policy. In the CAS time check policy, the channel control circuit 42A checks request queue 40 at the time the column address for the transaction is to be transmitted to determine if another transaction to the same page is queued. If so, the page may be kept open. Otherwise, the page may be closed.

To implement the CAS time check policy, or other page mode policies in which the request queue 40 is checked at some point, channel control circuit 42A may transmit the page address of a page which may be kept open (Page Addr in FIG. 2) and may assert the page inquire (Pg_i) signal shown in FIG. 2. Compare circuitry in request queue 40 may compare the page address to the corresponding portion of the addresses stored in the queue entries. If at least one match is detected, control circuit 50 may assert a hit signal to channel control circuit 42A, and channel control circuit 42A may keep the page open in response to the hit signal. If no match is detected, control circuit 50 may deassert the hit signal to channel control circuit 42A, and channel control circuit 42A may close the page. The above operation is illustrated in the flowchart of FIG. 4 via decision blocks 76 and 78 and block 80.

In addition to asserting the hit signal, control circuit 50 may set the priority indication (Pr) to indicate high priority in each entry for which a match is detected. The priority indication may be factored into the issuance of transactions to channel control circuit 42A (e.g. those transactions indicated as high priority may be issued out of order with respect to those transactions not indicated as high priority). By indicating transactions to the open page are high priority, these transactions may be more likely to be issued while the page is still open, and thus may be more likely to be completed with lower latency. The priority indication may, for example, be a bit similar to the description of the issued indication above. These operations are illustrated in the flowchart of FIG. 4 via decision blocks 76 and 78 and block 82.

Channel control circuit 42A may also determine that an open page is to be closed. If a memory access received by channel control circuit 42A has a page conflict with a page kept open by channel control circuit 42A, channel control circuit 42A may assert the retry signal (Retry) and provide the data buffer pointer of the retried transaction (Ptr) to request queue 40. The retry mechanism may be used generally for any purpose, in various embodiments. Thus, an issued transaction may either be acknowledged or retried. Control circuit 50 may clear the issued bit in the matching entry, and may also set the priority indication for the matching entry to indicate normal priority. By clearing the issued bit, control circuit 50 allows for the retried transaction to be reissued later. For example, if the priority indication is a bit, the bit may be cleared as illustrated in FIG. 4. Alternatively, the bit may be set to indicate normal priority, as desired. In this manner, transactions which were indicated as high priority for issuance due to addressing an open page may not be indicated as priority through the retry mechanism. This operation is illustrated in the flowchart of FIG. 4 via decision blocks 70, 72, and 104 and block 106.

As mentioned above, channel control circuit 42A also determines when to transmit or receive data for the transaction on channel 44A based on the Pipe Data for the transaction. When data is ready to be transferred, channel control circuit 42A may provide the data buffer pointer (Ptr) to request queue 40 and data buffer 52. Additionally, depending upon the type of transaction, channel control circuit 42A provides read/write controls to data buffer 50 via the write (Wr) and read (Rd) lines illustrated in FIG. 2 (which control circuit 50 also receives).

If the transaction is a read, channel control circuit 42A indicates that data from channel 44A is to be written to data buffer 52. Data buffer 52 captures the data from the data portion of channel 44A into the data buffer entry indicated by the data buffer pointer. Additionally, control circuit 50 may set a ready indication (Rdy) in the queue entry matching the pointer (Ptr) provided by channel control circuit 42A to indicate that the data is ready in data buffer 52. In one embodiment, the ready indication may be a bit similar to the above description of the issued indication. This operation is illustrated in the flowchart of FIG. 5 via decision blocks 70 and 88 and block 90. More particularly in the embodiment illustrated in FIG. 5, the ready indication may include a read ready bit (set for reads which are ready) and a write ready bit (set for writes which are ready). Other embodiments may employ a single ready bit or any other suitable ready indication.

Responsive to the data being ready and the transaction being a read, control circuit 50 may arbitrate for the data bus 34 using D_Req[7] to transfer the data to the requesting agent. Upon winning the arbitration, control circuit 50 causes request queue 40 to output the pointer from the queue entry storing the transaction as the bus pointer (Bus Ptr) to data buffer 52, which transfers the data from the selected entry on data bus 34. Additionally, control circuit 50 causes request queue 40 to output the transaction ID from the queue entry as the data transaction identifier on data bus 34 (particularly the D_ID lines illustrated in FIG. 2). Once the data has been transferred on data bus 34, the read transaction is complete and control circuit 50 deletes the transaction from request queue 40. As mentioned above, the transaction may be deleted by shifting the younger transactions down one entry. The push pointer 56 may also be decremented and the data buffer entry indicated by the pointer may be added to the free list 58.

On the other hand, if the transaction is a write, channel control circuit 42A indicates that data is being read from data buffer 52. Data buffer 52 provides data from the data buffer entry indicated by the data buffer pointer (Ptr) on the data portion of memory channel 44A. Additionally, control circuit 50 may determine that the write transaction is complete responsive to the data being written from the data buffer entry to the memory, and may delete the corresponding transaction from request queue 40. The push pointer may be decremented and the data buffer entry indicated by the pointer may be added to the free list. This operation is illustrated in the flow chart of FIG. 5 via decision blocks 70 and 88 and block 92.

It is noted that data corresponding to a transaction may be transmitted on channel 44A using multiple transfers. For example, in one embodiment, a block of 32 bytes may be transferable in one transaction. However, the data portion of the channel 44A may be 8 bytes wide, in one embodiment. In such an embodiment, 4 transfers may be used to transfer the block of data to or from memory. The Wr/Rd controls may include control signals to select which portion of the block is being read or written, and may include a last transfer indication indicating that the last transfer of the transaction is being performed. Control circuit 50 may set the read ready indication (for read transactions) or delete the transaction (for write transactions) responsive to the last transfer indication.

It is further noted that, for write transactions less than a block in size, one embodiment of channel control circuit 42A may read the block to be updated from memory (writing bytes not affected by the write transaction to the data buffer entry assigned to the write transaction) and may write the modified block from data buffer 52 back to memory. Other embodiments may perform a write on channel 44A less than a block in size.

In addition to interfacing with channel control circuits 42A–42B, request queue 40 and control circuit 50 continue to interface with bus 24 during various transactions. Particularly, for write transactions, the data may be received from data bus 34 at any time after the address phase of the transaction. Accordingly, compare circuitry in request queue 40 may compare the data transaction ID (D_ID) from data bus 34 to transaction IDs stored in request queue 40. If a matching transaction ID is detected (and the corresponding ready indication (Rdy) indicates that the data is not ready in data buffer 52 yet), control circuit 50 causes the data buffer pointer (Ptr) stored in the request queue 40 to be output as the bus pointer (Bus Ptr) to data buffer 52. Additionally, control circuit 50 sets the ready indication to indicate that the data is ready. More particularly in one embodiment, the ready indication may include a write ready bit, which may be set to indicate that the write data is ready. The ready indication is used in the matching of the data transaction ID because, once write data is transmitted for a write transaction, the transaction ID may be free for use by the requesting agent for another transaction. Thus, once the data has been received, the ready indication may be used by control circuit 50 to ignore subsequent matches with the data transaction ID (since the data transaction ID would then correspond to a different transaction than the one in the corresponding queue entry). This operation is illustrated in FIG. 5 via decision block 94 and blocks 96 and 98. Data buffer 52 may capture the data from data bus 34 into the data buffer entry indicated by the bus pointer (Bus Ptr).

It is noted that, in one embodiment, the data for a transaction may be transmitted in one transfer on the data bus 34. Other embodiments may use multiple transfers, in which case data buffer 52 may capture the portions of the data from each transfer into the entry identified by the Bus Ptr.

An additional function that may be performed by one embodiment of control circuit 50 and request queue 40 as an address phase of a memory transaction is received is to detect address conflicts between the address of the memory transaction being received and the addresses of other transactions in request queue 40. Generally, a first address "conflicts" with a second address if at least one byte accessed in response to the first address is also accessed in response to the second address. In the present embodiment, for example, addresses may conflict if they are in the same block. Other embodiments may be more or less granular in determining an address conflict.

Since transactions may be issued from request queue 40 out of order, noting address conflicts may allow control circuit 50 to ensure that the transactions having conflicting addresses are not issued out of order to the channel control circuits 42A–42B. As an address is being received from address bus 24, compare circuitry in request queue 40 may compare the address to the addresses of transactions in request queue 40. If a match is detected, control circuit 50 may set the address conflict indication (AC) in the queue entry assigned to the address being received to indicate the conflict. Setting the AC indication may prevent subsequent setting of the priority indication (Pr) to indicate high priority. In this manner, transactions having an address collision may not pass the older transactions. This operation is illustrated in the flowchart of FIG. 4 via decision block 100 and blocks 102. The address conflict indication may, for example, be a bit similar to the above description of the issued indication, or other encodings may be used.

Since request queue 40 and control circuit 50 interface with bus 24, request queue 40 and control circuit 50 may be in the bus clock domain corresponding to the bus clock (CLK). Similarly, since channel control circuits 42A–42B interface with memory 26, channel control circuits 42A–42B may be in the memory clock domain (Mem CLK). Data buffer 52 interfaces with both bus 24 and memory 26. In the illustrated embodiment, data buffer 52 is clocked by Mem CLK and is thus in the memory clock domain. Data buffer 52 may be designed in such a way that reads from data buffer 52 are clock independent. For example, data buffer 52 may be a plurality of registers or other clocked storage devices which provide a constant output of data stored therein. For the illustrated embodiment, data from data bus 34 may be synchronized to the memory clock domain before writing into data buffer 52. In another embodiment, data from memory may be synchronized to the bus clock (CLK) and data buffer 52 may be clocked by the bus clock (CLK). Alternatively, data buffer 52 may be designed to be written responsive to both clocks, if desired.

Generally, while request queue 40 is shown as receiving the bus clock (CLK) and the channel control circuits 42A–42B and data buffer 52 are shown receiving the memory clock (Mem CLK), these circuits may use clocks derived from the corresponding bus clock or memory clock. The frequency of the derived clocks could be a multiple of the frequency of the corresponding clock, or may be the same frequency as the corresponding clock. The derived clocks may generally be phase locked to the corresponding clock. Thus, these circuits may be said to be clocked with a clock corresponding to the bus clock or the memory clock.

Generally, data buffer 52 includes a plurality of data buffer entries. Each data buffer entry is configured to store up to the maximum amount of data that may be transferred on bus 24 for one transaction. The maximum amount of data may be referred to as a block. The block may be any suitable size. In one embodiment, a block of 32 bytes is used, although other sizes such as 16 or 64 bytes or any other size may be selected.

It is noted that the above description refers to capturing information from memory transactions in request queue 40 and data buffer 52. In one embodiment, the addressable region provided by bus 24 is divided into address spaces including a memory address space. Control circuit 50 may include decode logic to decode the addresses from address bus 24 to detect a memory transaction. Alternatively, other control signals (e.g. Cmd signals) may be used to indicate whether or not a transaction is a memory transaction. Additionally, in embodiments in which L2 cache 14 is employed, a memory transaction may not be validated in request queue 40 until the hit/miss indication is provided by L2 cache 14. Still further, in certain embodiments, system 10 may employ an intervention protocol for coherent transactions, in which a coherent agent provides the data on bus 24 for a transaction if the coherent agent has sufficient ownership of the data (e.g. modified or exclusive). In such embodiments, a memory transaction may be invalidated in request queue 40 and data buffer 52 if a coherency agent is to supply the data.

It is noted that, while the embodiment illustrated in FIG. 2 returns the data buffer pointer (Ptr) for various purposes, other embodiments may return separate data buffer pointers for each purpose, to allow the various purposes to proceed in parallel. For example, an acknowledge pointer, a retry pointer, and a read/write pointer could be returned by channel control circuit 42A.

It is noted that, while the above discussion may have referred to queue entries storing transactions or channel control circuits performing operations for transactions, generally a queue entry may store information corresponding to a transaction (e.g. the address, whether the transaction is read or write, etc.) and the channel control circuits may perform memory operations in response to transactions using the information from the queue entry.

Figure 3:
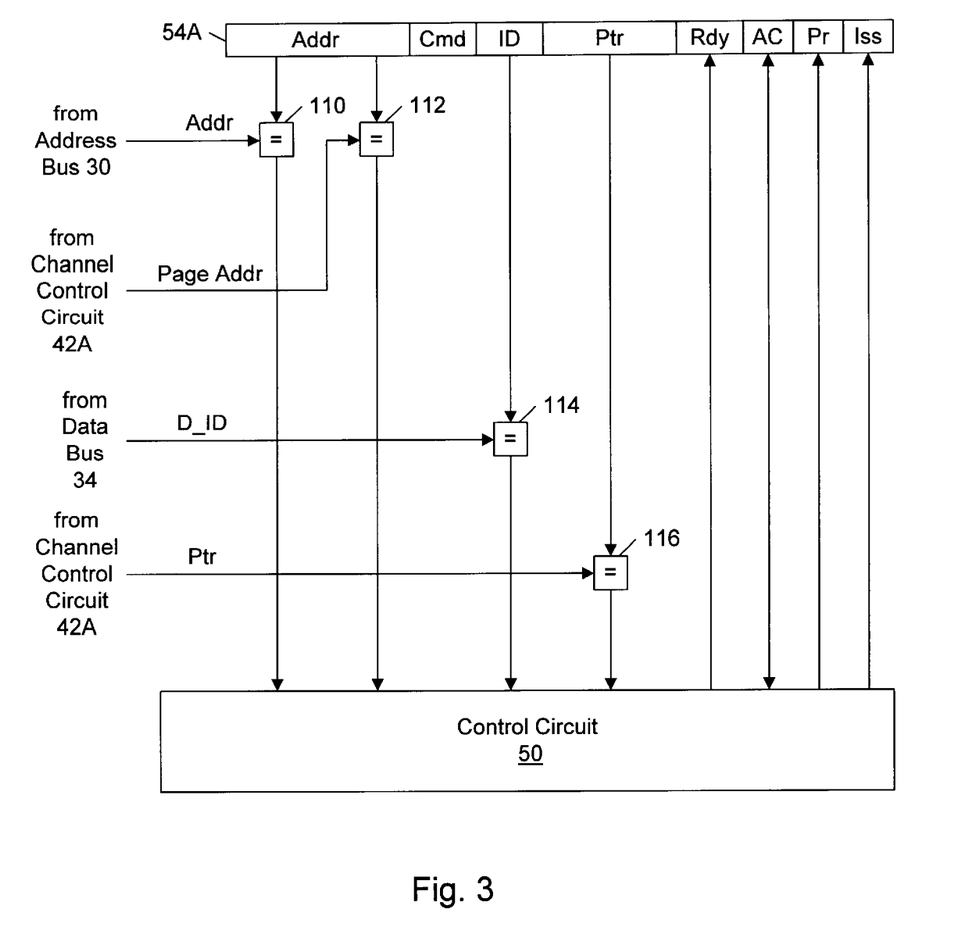
FIG. 3 is a block diagram of one embodiment of a portion of the memory controller shown in FIG. 2.

Turning next to FIG. 3, a block diagram illustrating one embodiment of queue entry 54A and corresponding compare circuitry including comparators 110, 112, 114, and 116 is shown. Similar comparators may be included for each other queue entry in request queue 40. Furthermore, comparators similar to comparators 112 and 116 may be provided for use with inputs from channel control circuit 42B (and additional comparators for other channel control circuits, in other embodiments). Control circuit 50 is also illustrated in FIG. 3. Control circuit 50 is coupled to queue entry 54A and to each of comparators 110, 112, 114, and 116, which are further coupled to queue entry 54A.

Comparator 110 is coupled to receive the address stored in queue entry 54A and is coupled to receive the address presented on address bus 30. Thus, comparator 110 may detect an address conflict between the address stored in queue entry 54A and the address presented on address bus 30. The output of comparator 110 (indicating whether or not a match is detected) is provided to control circuit 50.

Comparator 112 is coupled to receive the page address provided by channel control circuit 42A and a corresponding portion of the address stored in queue entry 54A. Thus, comparator 112 may detect that the address stored in queue entry 54A addresses the same page as the page address. The output of comparator 112 (indicating whether or not a match is detected) is provided to control circuit 50.

Comparator 114 is coupled to receive the transaction ID from queue entry 54A and the data transaction ID from data bus 34. Thus, comparator 114 may detect that the data phase of the transaction represented in queue entry 54A is occurring on data bus 34. The output of comparator 114 (indicating whether or not a match is detected) is provided to control circuit 50.

Finally, comparator 116 is coupled to receive the data buffer pointer from queue entry 54A and the data buffer pointer from channel control circuit 42A. Thus, comparator 116 may detect when channel control circuit 42A is communicating with control circuit 50, request queue 40, and/or data buffer 52 with regard to the transaction represented by queue entry 54A. The output of comparator 116 (indicating whether or not a match is detected) is provided to control circuit 50.

It is noted that the compare circuitry may be provided in any suitable fashion. For example, the compare circuitry may be integrated into request queue 40 as content addressable memory (CAM) cells. Alternatively, the compare circuitry may be physically located near the corresponding queue entry but not integrated into it, or may be part of control circuit 50, as desired.

Figure 6:
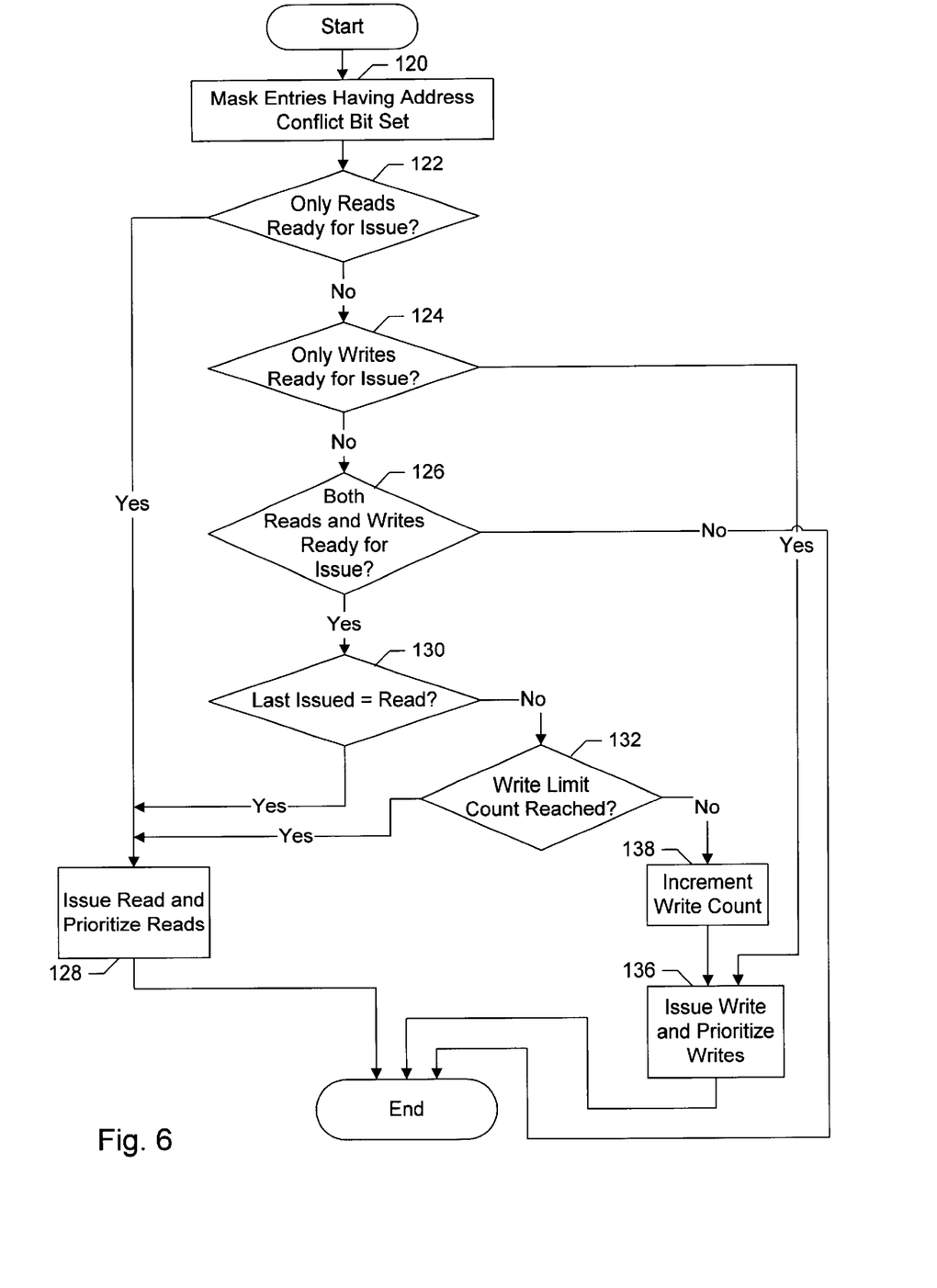
FIG. 6 is a flowchart illustrating operation of one embodiment of a control circuit for scheduling transactions for memory access.

Turning next to FIG. 6, a flowchart is shown illustrating an exemplary issue selection process which may be used by one embodiment of control circuit 50 for selecting a transaction for issuance to a channel control circuit. A similar flowchart may apply for each channel control circuit, based on the transactions issuable to that channel control circuit. A transaction is issuable to a channel control circuit if that transaction is not already issued (as indicated by the issue indication in the queue entry corresponding to the transaction) and is a transaction which is mapped to that channel control circuit. Additionally, a write may be issuable if the above conditions are true and if the ready indication is set to indicate that the write data is stored in data buffer 52. Other embodiments are possible and contemplated. While the blocks shown in FIG. 6 are illustrated in a particular order for ease of understanding, any suitable order may be used. Furthermore, blocks may be performed in parallel by combinatorial logic circuitry in control circuit 50.

Control circuit 50 may mask those queue entries for which the address conflict bit is set (block 120) from being selected unless that queue entry is the oldest queue entry. This masking may ensure that transactions having address conflicts are not selected. Thus, transactions for which an address conflict is noted may not be selected until they reach the head of the queue (i.e. are the oldest transaction). Other embodiments may update the address conflict bit as transactions are issued to allow transactions having an address conflict to issue out of order once the conflict is resolved.

In the embodiment illustrated in FIG. 6, control circuit 50 may apply different criteria based on whether only reads are issuable, only writes are issuable, or both reads and writes are issuable. Each of these scenarios is shown in FIG. 6 with a respective decision block 122, 124, and 126. If only reads are issuable, then a read is selected for issuance (block 128). Additionally, the issuable reads may be prioritized to select the next read for issuance (e.g. using the priority indications and the order the reads were received). Similarly, if only writes are issuable, then a write is selected for issuance and the remaining writes may be prioritized to select the next write for issuance (block 136).

If both reads and writes are issuable, control circuit 50 may determine if the last transaction to be issued to and acknowledged by this channel control circuit was a read transaction (decision block 130). If so, control circuit 50 may select another read for issuance (block 128). On the other hand, if the last transaction to be issued to and acknowledged by this channel control circuit was a write transaction (i.e. not a read transaction—decision block 130), control circuit 50 may determine if another write transaction is to be issued. In one embodiment, control circuit 50 may limit the number of consecutively issued write transactions. In such an embodiment, control circuit 50 may determine if the limit has been reached (decision block 132). If the limit has not been reached, control circuit 50 may increment the write count (block 138) and issue a write transaction (block 136). If the limit has been reached, control circuit 50 issues a read transaction (block 128).

Figure 7:
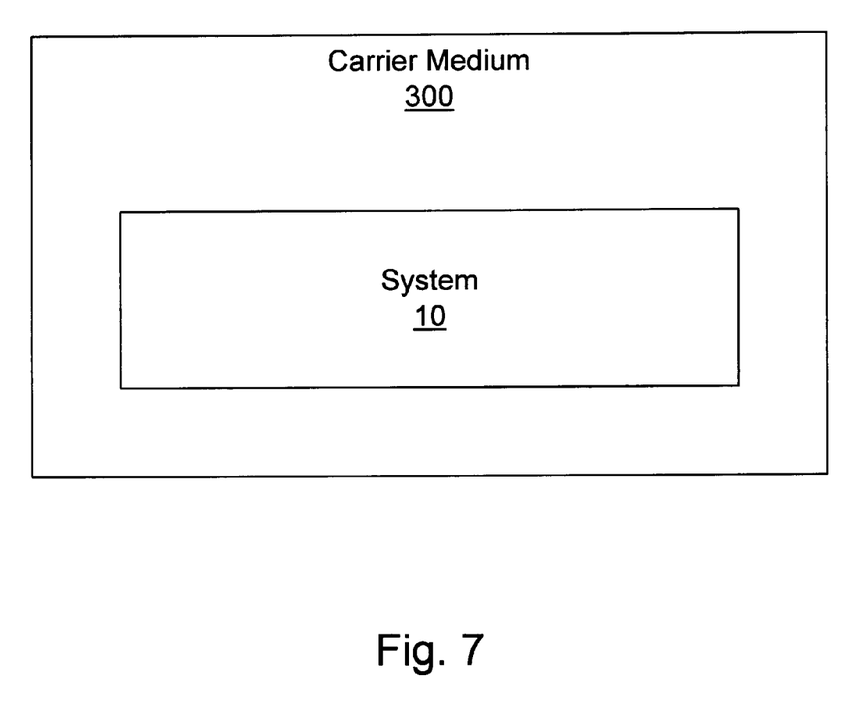
FIG. 7 is a block diagram of a carrier medium.

Turning next to FIG. 7, a block diagram of a carrier medium 300 including a database representative of system 10 is shown. Generally speaking, a carrier medium may include storage media such as magnetic or optical media, e.g., disk or CD-ROM, volatile or non-volatile memory media such as RAM (e.g. SDRAM, RDRAM, SRAM, etc.), ROM, etc., as well as transmission media or signals such as electrical, electromagnetic, or digital signals, conveyed via a communication medium such as a network and/or a wireless link.

Generally, the database of system 10 carried on carrier medium 300 may be a database which can be read by a program and used, directly or indirectly, to fabricate the hardware comprising system 10. For example, the database may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising system 10. The netlist may then be placed and routed to produce a data set describing geometric shapes to be applied to masks. The masks may then be used in various semiconductor fabrication steps to produce a semiconductor circuit or circuits corresponding to system 10. Alternatively, the database on carrier medium 300 may be the netlist (with or without the synthesis library) or the data set, as desired.

While carrier medium 300 carries a representation of system 10, other embodiments may carry a representation of any portion of system 10, as desired, including any combination of an agent, a memory controller, a request queue, a channel control circuit, a control circuit, a data buffer, a bus, memory, etc.

Numerous variations and modifications will become apparent to those skilled in the art once the above disclosure is fully appreciated. It is intended that the following claims be interpreted to embrace all such variations and modifications.

What is claimed is:

1. A memory controller comprising:
    a queue coupled to receive at least addresses of transactions from a bus, said queue having a plurality of queue entries, each of said plurality of queue entries configured to store an address of a transaction and a pointer to a data buffer entry corresponding to said transaction;
    a channel control circuit coupled to said queue and configured to interface to a memory; and
    a control circuit coupled to said queue and to said channel control circuit, wherein said control circuit is configured to issue a first address of a first transaction and a first pointer to said data buffer entry corresponding to said first transaction;
    wherein said channel control circuit is configured to acknowledge said first address by returning said first pointer to said queue.

2. The memory controller as recited in claim 1 wherein said channel control circuit is further configured to assert an acknowledge signal concurrent with returning said first pointer to said queue.

3. The memory controller as recited in claim 2 wherein said channel control circuit is configured to retry said first address by asserting a retry signal instead of said acknowledge signal.

4. The memory controller as recited in claim 1 wherein said queue is configured to store transactions in an order received, and wherein said control circuit is configured to issue transactions from said queue to said channel control circuit in a different order from said order received.

5. The memory controller as recited in claim 1 wherein said queue is clocked by a first clock corresponding to said bus, and wherein said channel control circuit is clocked by a second clock corresponding to said memory.

6. The memory controller as recited in claim 1 further comprising compare circuitry coupled to each of said plurality of queue entries and to said control circuit, wherein said compare circuitry is configured to compare said first pointer to said pointers stored in each of said plurality of queue entries, and wherein each of said plurality of queue entries is configured to store an issued indication indicative of whether or not said address stored therein has been issued to said channel control circuit, and wherein said control circuit is configured to modify said issued indication in one of said plurality of queue entries to indicate that said address has been issued responsive to said pointer stored in said one of said plurality of queue entries matching said first pointer.

7. The memory controller as recited in claim 1 further comprising compare circuitry coupled to each of said plurality of queue entries and to said control circuit, wherein said compare circuitry is configured to compare a second address of a second transaction to said addresses stored in said plurality of queue entries, and wherein each of said plurality of queue entries is configured to store an address conflict indication indicative of whether or not said address stored therein conflicts with another address in a different queue entry of said plurality of queue entries, and wherein said control circuit is configured to modify said address conflict indication in one of said plurality of queue entries assigned to said second transaction responsive to said second address matching one of said addresses.

8. The memory controller as recited in claim 7 wherein said control circuit is configured not to issue said second address until said second address is oldest in said queue.

9. The memory controller as recited in claim 1 wherein said channel control circuit is configured to transmit a page address indicative of a page currently open in said memory, the memory controller further comprising compare circuitry coupled to said queue and to said control circuit, wherein said compare circuitry is configured to compare said page address to a corresponding portion of said addresses stored in said plurality of queue entries, and wherein said control circuit is configured to assert a hit signal to said channel control circuit if at least one of said corresponding portions of said addresses matches said page address.

10. The memory controller as recited in claim 9 wherein said channel control circuit is configured to keep said page open responsive to said hit signal being asserted.

11. The memory controller as recited in claim 9 wherein said channel control circuit is configured to close said page responsive to said hit signal being deasserted.

12. The memory controller as recited in claim 9 wherein each of said plurality of queue entries is configured to store a priority indication indicative of whether or not said address stored therein has priority for issuing to said channel control circuit, and wherein said control circuit is configured to modify said priority indication to indicate high priority in one of said plurality of queue entries responsive to said corresponding portion of said address stored therein matching said page address.

13. The memory controller as recited in claim 12 wherein said channel control circuit is configured to retry said first address, and wherein said control circuit is configured to modify said priority indication to indicate normal priority in one of said plurality of queue entries corresponding to said first address responsive to said channel control circuit retrying said first address.

14. The memory controller as recited in claim 1 wherein said channel control circuit is configured to return said first pointer to said queue during a write of data to said data buffer entry by said channel control circuit, and wherein each of said plurality of queue entries is configured to store a ready indication indicative of whether or not data is stored in said data buffer entry, and wherein said memory controller further comprises compare circuitry coupled to said queue and to said control circuit, wherein said compare circuitry is configured to compare said first pointer to said pointers stored in said plurality of queue entries, and wherein said control circuit is configured to modify said ready indication in one of said plurality of queue entries to indicate data is stored in said data buffer entry responsive to said pointer in said one of said plurality of queue entries matching said first pointer.

15. The memory controller as recited in claim 1 wherein said channel control circuit is configured to return said first pointer to said queue during a read of data from said data buffer entry by said channel control circuit, and wherein said memory controller further comprises compare circuitry coupled to said queue and to said control circuit, wherein said compare circuitry is configured to compare said first pointer to said pointers stored in said plurality of queue entries, and wherein said control circuit is configured to delete said address stored in one of said plurality of queue entries responsive to said pointer in said one of said plurality of queue entries matching said first pointer.

16. The memory controller as recited in claim 15 wherein said queue is configured to shift addresses younger than said address in said one of said plurality of queue entries down an entry to delete said address from said one of said plurality of queue entries.

17. The memory controller as recited in claim 1 wherein said queue is coupled to receive transaction identifiers concurrent with said addresses on said bus, and wherein each of said plurality of entries is configured to store a transaction identifier corresponding to said address.

18. The memory controller as recited in claim 17 wherein said queue is coupled to receive a data transaction identifier on said bus corresponding to a data phase of a transaction, wherein said memory controller comprises compare circuitry coupled to said plurality of queue entries and to said control circuit, wherein said compare circuitry is configured to compare said transaction identifiers stored in said plurality of queue entries to said data transaction identifier, and wherein said control circuit is configured to cause one of said plurality of queue entries to output said pointer responsive to said transaction identifier stored therein matching said data transaction identifier.

19. A method comprising:
receiving at least addresses of transactions from a bus into a queue having a plurality of queue entries, each of said plurality of queue entries configured to store an address of a transaction and a pointer to a data buffer entry corresponding to said transaction;
issuing a first address of a first transaction and a first pointer to a data buffer entry corresponding to said first address, said issuing to a channel control circuit; and
returning said first pointer from said channel control circuit to acknowledge said issuing.

20. The method as recited in claim 19 further comprising asserting an acknowledge signal concurrent with returning said first pointer to acknowledge said issuing.

21. The method as recited in claim 20 further comprising asserting a retry signal on current with returning said first pointer to retry said first address.

22. The method as recited in claim 19 further comprising:
comparing said first pointer to said pointers stored in said plurality of queue entries to detect a match in one of said plurality of queue entries; and
modifying an issued indication in said one of said plurality of queue entries to indicate issued, wherein said issued indication is indicative of whether or not said address stored in said one of said plurality of queue entries has been issued to said channel control circuit.

23. The method as recited in claim 19 further comprising:
transmitting a page address indicative of a page currently open in said memory from said channel control circuit to said queue;
comparing said page address to a corresponding portion of said addresses stored in said plurality of queue entries;
asserting a hit signal to said channel control circuit responsive to at least one of said corresponding portions of said addresses matching said page address; and
keeping said page open responsive to said asserting said hit signal.

24. The method as recited in claim 23 further comprising:
deasserting said hit signal to said channel control circuit responsive to none of said corresponding portions of said address matching said page address; and
closing said page responsive to said deasserting said hit signal.

25. The method as recited in claim 23 further comprising modifying a priority indication in one of said plurality of queue entries to indicate that said address stored therein has high priority for said issuing responsive to said corresponding portion of said address stored therein matching said page address.

26. The method as recited in claim 25 further comprising:
retrying said first address;
modifying said priority indication in a first one of said plurality of queue entries corresponding to said first address to indicate normal priority for said issuing responsive to said corresponding portion of said address stored therein matching said page address.

27. The method as recited in claim 19 further comprising:
returning said first pointer to said queue during a write of data to said data buffer entry by said channel control circuit;
comparing said first pointer to pointers stored in each of said plurality of queue entries; and
modifying a ready indication indicative of whether or not data is stored in said data buffer entry to indicate data is stored in said data buffer responsive to said pointer in said one of said plurality of queue entries matching said first pointer.

28. The method as recited in claim 19 further comprising:
returning said first pointer to said queue during a read of data from said data buffer entry by said channel control circuit;
comparing said first pointer to pointers stored in each of said plurality of queue entries; and
deleting an address stored in one of said plurality of queue entries responsive to said pointer stored in said one of said plurality of queue entries matching said first pointer.

29. The method as recited in claim 28 wherein said deleting comprises shifting addresses younger than said address in said one of said plurality of queue entries down an entry.

30. The method as recited in claim 19 further comprising:
receiving transaction identifiers into said queue concurrent with said addresses on said bus, each of said plurality of queue entries configured to store a transaction identifier of a transaction;
receiving a data transaction identifier on said bus, said data transaction identifier corresponding to a data phase of a transaction;
comparing said data transaction identifier to said transaction identifiers in said plurality of queue entries; and
outputting said pointer from one of said plurality of queue entries responsive to said transaction identifier stored in said one of said plurality of queue entries matching said data transaction identifier.

31. The method as recited in claim 19 further comprising issuing said addresses stored in said plurality of queue entries in a different order than an order in which said addresses are received.

\* \* \* \* \*

UNITED STATES PATENT AND TRADEMARK OFFICE
CERTIFICATE OF CORRECTION

PATENT NO.    : 6,449,701 B1
DATED         : September 10, 2002
INVENTOR(S)   : James Y Cho It is certified that error appears in the above-identified patent and that said Letters Patent is hereby corrected as shown below:

<u>Column 18,</u>
Line 2, please delete "on current" and insert -- concurrent -- therein.

Signed and Sealed this

Twenty-eighth Day of January, 2003

JAMES E. ROGAN
*Director of the United States Patent and Trademark Office*